United States Patent
Dequin (10) Patent No.: US 9,796,470 B2
(45) Date of Patent: Oct. 24, 2017

(54) METHOD AND AN AIRCRAFT FOR MINIMIZING THE RISKS OF THE AIRCRAFT TOPPLING ON THE GROUND

(71) Applicant: AIRBUS HELICOPTERS

(72) Inventor: Andre-Michel Dequin, Puyricard (FR)

(73) Assignee: AIRBUS HELICOPTERS, Marignane (FR)

( * ) Notice: Subject to any disclaimer, the term of this patent is extended or adjusted under 35 U.S.C. 154(b) by 473 days.

(21) Appl. No.: 14/024,756

(22) Filed: Sep. 12, 2013

(65) Prior Publication Data

US 2014/0070048 A1    Mar. 13, 2014

(30) Foreign Application Priority Data

Sep. 13, 2012    (FR) ..................... 12 02443

(51) Int. Cl.
| | | |
|---|---|---|
| *B64C 27/54* | (2006.01) | |
| *B64C 27/57* | (2006.01) | |
| *B64D 43/00* | (2006.01) | |
| *B64D 45/00* | (2006.01) | |

(52) U.S. Cl.
CPC .............. *B64C 27/57* (2013.01); *B64D 43/00* (2013.01); *B64D 45/00* (2013.01)

(58) Field of Classification Search
None
See application file for complete search history.

(56) References Cited

U.S. PATENT DOCUMENTS

| | | | |
|---|---|---|---|
| 6,276,640 B1 * | 8/2001 | Laflisse .................. | B64C 13/50 244/178 |
| 6,411,869 B2 | 6/2002 | Permanne | |
| 8,568,096 B2 | 10/2013 | Eglin | |
| 2001/0044679 A1 | 11/2001 | Permanne | |

(Continued)

FOREIGN PATENT DOCUMENTS

| | | |
|---|---|---|
| CN | 101905743 A | 12/2010 |
| DE | 202007010854 U1 | 10/2007 |

(Continued)

OTHER PUBLICATIONS

Chinese Office Action Dated May 5, 2015, Application No. 201310415721.4, Applicant Airbus Helicopters, 2 Pages.

(Continued)

*Primary Examiner* — Jerrah Edwards
*Assistant Examiner* — Paul Castro
(74) *Attorney, Agent, or Firm* — Brooks Kushman P.C.

(57) ABSTRACT

A method of assisting a pilot in order to minimize the risks of an aircraft rolling over on the ground, the aircraft having a main rotor and a yaw movement control rotor (4), together with lateral cyclic pitch control means for the main rotor and yaw movement control means for the yaw movement control rotor. At least one measurement is taken relating to left forces exerted on a left side undercarriage and to right forces exerted on a right side undercarriage in order to evaluate asymmetry, if any, between the left and right forces, and then a recommended position (26) is determined for at least one of the yaw and lateral cyclic pitch control means in order to make the left and right forces more symmetrical. Each recommended position is displayed on a display unit.

19 Claims, 2 Drawing Sheets

(56) References Cited

U.S. PATENT DOCUMENTS

| | | | |
|---|---|---|---|
| 2011/0125368 A1* | 5/2011 | Yokota | B60T 8/17554 |
| | | | 701/41 |
| 2014/0002280 A1* | 1/2014 | He | G05D 1/102 |
| | | | 340/946 |
| 2014/0012468 A1* | 1/2014 | Le | B60G 17/019 |
| | | | 701/38 |

FOREIGN PATENT DOCUMENTS

| | | | |
|---|---|---|---|
| FR | 2787763 A1 | 6/2000 | |
| FR | 2809082 A1 | 11/2001 | |

OTHER PUBLICATIONS

Search Report and Written Opinion; Application No. FR1202443; dated May 16, 2013.

* cited by examiner

METHOD AND AN AIRCRAFT FOR MINIMIZING THE RISKS OF THE AIRCRAFT TOPPLING ON THE GROUND

CROSS REFERENCE TO RELATED APPLICATIONS

This application claims priority to French patent application No. FR 12 02443 filed on Sep. 13, 2012, the disclosure of which is incorporated in its entirety by reference herein.

BACKGROUND OF THE INVENTION (1) Field of the Invention

The present invention relates to a method and to an aircraft for minimizing the risks of the aircraft toppling while on the ground. The invention relates in particular to a rotary wing aircraft having a main rotor and a yaw movement control rotor, together with wheeled landing gear.

(2) Description of Related Art

A rotary wing aircraft has an airframe. A rotary wing aircraft is also provided with landing gear on which the airframe rests when the aircraft is standing on the ground. Such landing gear may be provided with a plurality of undercarriages, each having at least one wheel. The landing gear is then referred to as "wheeled landing gear".

Furthermore, in a rotary wing aircraft, the airframe may carry a main lift rotor, and a yaw movement control rotor. For a helicopter type aircraft, the main rotor contributes to providing the aircraft both with lift and with propulsion.

The yaw movement control rotor is conventionally carried by a tail boom connected to the airframe. The yaw movement control rotor is thus located at the rear end of the aircraft. The yaw movement control rotor is commonly referred to as the "tail rotor".

This yaw movement control rotor exerts lateral thrust seeking in particular to counter the yaw movement torque generated on the airframe by the main rotor.

Furthermore, the pilot can control this lateral thrust with the help of yaw movement control means for piloting yaw movements of the aircraft. Such yaw movement control means commonly comprise a pair of pedals acting on the collective pitch of the blades of the yaw movement control rotor.

The main rotor rotates substantially in a plane that can be tilted relative to the airframe. The pilot then controls the pitch of the blades of the main rotor cyclically in order to tilt the main rotor so as to direct the aircraft. For this purpose, the pilot has cyclic pitch control means, e.g. such as a cyclic stick.

The cyclic pitch control means may be subdivided into means for controlling lateral cyclic pitch enabling the main rotor to be tilted laterally, and means for controlling longitudinal cyclic pitch enabling the main rotor to be tilted longitudinally.

The aircraft also has collective pitch control means for controlling the pitch of the blades of the main rotor collectively, in particular to enable the pilot to cause the aircraft to move in elevation. For this purpose, the aircraft may include a collective stick.

On aircraft that are of sufficient size, the yaw movement control rotor is often high above the ground. This characteristic makes it possible to maximize the distance between the ground and the low point through which the blades of the yaw movement control rotor pass. This serves to minimize any risk of interfering with people on the ground.

With such a high position, any variation in the thrust from the yaw movement control rotor gives rise to a lateral toppling torque. On the ground, this toppling torque is compensated by opposing torque from the landing gear. The ground reaction on the undercarriages present on the side where the toppling torque applies increases, while the ground reaction decreases on the undercarriages present on the opposite side.

If the toppling torque is sufficient for the ground reaction on an undercarriage to become zero, then the undercarriage leaves the ground. The aircraft then falls over on the opposite side. Measuring the asymmetry of loading on the undercarriages thus gives an indication of proximity to the toppling limit.

When the pilot requests a large change in the thrust from the yaw movement control rotor, the induced toppling torque may be compensated by a roll moment. The roll moment may be produced by the main lift rotor tilting laterally in the opposite direction to the variation in the thrust from the yaw movement control rotor.

Such variations in the thrust from the yaw movement control rotor are used by the pilot to steer the aircraft along a path on the ground. Pilots are therefore taught during pilot training to co-ordinate control of the thrust from the yaw movement control rotor and control of the lateral tilting of the main rotor so as to avoid any risk of the aircraft toppling.

The problem becomes more complicated in the presence of wind. The thrust from the yaw movement control rotor does not depend only on its collective pitch, but depends also on the wind, and mainly on the lateral component of the wind speed. Fluctuations in the wind, whether in force or in direction, can then lead to a change in the toppling torque exerted on the aircraft while it is on the ground.

If the safety margin relative to actual toppling of the aircraft is not sufficient, and if the pilot does not react promptly, a gust of wind can lead to difficulty.

Furthermore, unlike variations in the thrust from the yaw movement control rotor under the control of the pilot, variations in said thrust caused by the wind can often be identified only by the effects they produce. For example, a slow change in wind direction can be very difficult to perceive, since it gives rise to a change in the equilibrium of the aircraft that takes place slowly.

Documents FR 2 787 763, FR 2 809 082, and DE 20 2007 010854 do not belong to the field of the invention and they are remote from the invention.

For example, document FR 2 787 763 relates to a device for recentering a flight control member.

BRIEF SUMMARY OF THE INVENTION

An object of the present invention is to propose a method of assisting a pilot in order to minimize the risks of a rotary wing aircraft rolling over on the ground.

According to the invention, a method of assisting a pilot thus seeks to minimize the risk of an aircraft rolling over on the ground, the aircraft having a main rotor for providing lift and possibly also propulsion, and a rotor for controlling yaw movement. The aircraft is provided with control means including lateral cyclic pitch control means for the main rotor and yaw movement control means for the yaw movement control rotor.

The aircraft also has wheeled landing gear with at least one left side undercarriage and at least one right side undercarriage arranged on either side of an anteroposterior longitudinal plane of the aircraft.

In the method, during a utilization stage, the following steps are performed:

taking at least one measurement relating to the left forces exerted on the left side undercarriage and to the right forces exerted on the right side undercarriage in order to evaluate asymmetry, if any, between the left and right forces;

when said at least one measurement reveals asymmetry between the left and right forces, determining a recommended position for at least one of the yaw movement control and lateral cyclic pitch control means in order to make the left and right forces more symmetrical; and using a display unit to display each recommended position to inform a pilot of the position to be reached by said control means in question in order to keep the aircraft within a domain of roll stability on the ground.

The term "recommended position" is used to mean a position that is to be reached or indeed a range of positions that is to be reached.

Furthermore, a recommended position is displayed on a display unit by displaying at least one symbol representing the recommended position in question.

Furthermore, the term "utilization stage" is used to mean use of the aircraft as an aircraft. This stage is referred to for convenience as a "utilization stage" so that it can be identified easily, and so as to avoid confusion with other stages. The person skilled in the art sometimes uses the term "operational stage".

Under such conditions, the invention seeks to make the loading on the left and right undercarriages more symmetrical. The person skilled in the art commonly uses the term "loading" to designate the forces carried by the undercarriages.

It should be recalled that an aircraft on the ground runs the risk of rolling onto one side when the toppling torque exerted on the aircraft leads to the ground reaction on one of the undercarriages being reduced to zero. In such a configuration, the undercarriage having zero ground reaction lifts off the ground. The aircraft then rolls onto the opposite side.

Consequently, asymmetrical loading of the side undercarriages is a valid indication that the toppling limit of the aircraft is being approached.

Using the method, a recommended position is thus determined for at least one of the yaw movement control and lateral cyclic pitch control means in order to make the loading on the side undercarriages more symmetrical.

For this purpose, measurements are taken relating to the loading of the undercarriages. Each recommended position to be compiled with is deduced therefrom. It can be understood that the manufacturer may use simulation or testing to establish the appropriate recommended positions as a function of the measured asymmetry.

Depending on the embodiment, the loading of the undercarriages may be measured directly or indirectly and that makes it possible to deduce each of the recommended positions that are to be displayed.

A measurement is said to be performed "directly" when the measurement provides an indication of the loading on each undercarriage, and consequently will reveal asymmetry, if any. A direct measurement may be a measure of loading asymmetry or indeed a measurement that makes it possible to calculate the loading on each undercarriage.

In contrast, a measurement is said to be performed "indirectly" when the information provided does not have a direct relationship with the loadings to be evaluated, but nevertheless makes it possible to deduce the appropriate corrective actions to be taken, where applicable.

Thus, in a first implementation, sensors that are generally present on an aircraft can be used for measuring the symmetry of the loading on the undercarriages, indirectly.

In a second implementation, specific sensors are used to enable asymmetry of undercarriage loading to be measured directly.

The method may also include one or more of the following additional characteristics.

For example, during an initialization stage the influence of the yaw movement control and lateral cyclic pitch control means on the asymmetry of the left and right forces is determined in order to establish at least one database providing said at least one recommended position for making the left and right forces more symmetrical, said database being used to determine each recommended position during said utilization stage.

The influence of the lateral cyclic pitch control means and of the yaw movement control means on this loading asymmetry may be determined either by using a model simulating the aircraft or by performing tests on the aircraft on the ground.

On the basis of the loading asymmetry of the side undercarriages and on the basis of the influence of the yaw and lateral cyclic pitch controls on this loading asymmetry, the recommended positions can easily be calculated in order to return to a loading that is symmetrical.

The term "database" is used to mean a database as such, or indeed any means making it possible to store the influence of the yaw movement control and lateral cyclic pitch control means.

For example, this influence may be represented by a mathematical relationship delivering either a recommended position to be reached as a function in particular of the current position of the control means in question, or else a movement to be performed by the control means.

The initialization stage is thus a preliminary stage that is performed once only, whereas the utilization stage is performed on each occasion the aircraft is utilized.

Furthermore, during the initialization stage, the influence of the yaw movement control and lateral cyclic pitch control means on the asymmetry of the left and right forces may be determined as a function of the speed of rotation of the main rotor and/or of the yaw movement control rotor.

Under such circumstances, during the utilization stage, at least one measurement is taken relating to the left forces exerted on the left side undercarriage and to the right forces exerted on the right side undercarriage, and at least one measurement is taken relating to each speed of rotation taken into consideration during the initialization stage.

For example, each speed of rotation may equally well be determined directly by measuring the speed of rotation of the rotor in question, or indirectly by measuring a drive speed of a rotary member used for driving the main rotor and/or the tail rotor.

This influence of the yaw movement control and lateral cyclic pitch control means varies with the square of the speed of rotation of the rotors. Measuring their speed of rotation is thus advantageous in order to be able to adjust the influence of the control means accordingly.

Furthermore, with a recommended position for at least one of said control means being determined and displayed, a current position is determined of each control means for which a position is recommended, and the current position is displayed on said display unit.

A pilot can then view the current position of a control means together with the recommended position for that control means. Depending on the state of operation of the aircraft, the display unit may then display nothing, or it may display the current position together with the recommended position for the lateral cyclic pitch control means, and/or the current position together with the recommended position for the yaw movement control means.

Since both the yaw movement control and the lateral cyclic pitch control have an influence, various options are available concerning the information to be shown on the display unit.

In order to display a recommended position for the lateral cyclic pitch control means and for the yaw movement control means, a single symbol may be displayed in a two-dimensional representation in which the dimensions relate respectively to the position of the lateral cyclic pitch control means and to the position of the yaw movement control means.

A rectangle may thus be displayed. The rectangle may possess a horizontal side representing the range over which the lateral cyclic pitch control means can be varied, and a vertical side representing the range over which the yaw movement control means can be varied (or vice versa). In this rectangle, a point may give the current positions of the lateral cyclic pitch control means and of the yaw movement control means, and a curve may give the combinations of these two control means that make it possible to return to symmetrical loading of the undercarriages with acceptable tolerance.

It is also possible to simplify the display by giving priority to a control that the pilot is to operate and to use a horizontal scale representing the range of the second control, displaying on that scale the current position of the second control and its recommended position, i.e. the position that re-establishes loading symmetry with the present position of the priority control.

For example, priority is given to a single one of the flight controls for keeping the aircraft in the stable domain by displaying a recommended position on a scale either for the lateral cyclic pitch control means or for the yaw movement control means, depending whether the aircraft is moving relative to the ground.

When the aircraft is stationary on the ground, it is natural to seek to reduce the thrust from the yaw movement control rotor to zero since it serves no purpose, and to leave the pilot in charge of keeping the main rotor at a small amount of lateral tilt so as to avoid any risk of interfering with obstacles, with the pilot doing this by means of the lateral cyclic pitch control. It is then possible to give priority to the lateral cyclic pitch control and to display the recommended position for the yaw movement control.

If the aircraft then begins to taxi, the yaw movement control is needed for steering it along a path. It is then possible to give priority to the yaw movement control and to display the recommended position for the lateral cyclic pitch control.

Thus, it is possible to determine whether the aircraft is taxiing on the ground, and if the aircraft is taxiing, a recommended position is displayed solely for the lateral cyclic pitch control means.

Taxiing may include a period of moving in translation and/or of turning about a vertical axis. Turning may be detected directly by measuring heading, and movement in translation may be determined by measuring position (e.g. with a global positioning system (GPS)). The use of a GPS may be avoided by monitoring the increases in the collective pitch of the blades of the main rotor, since any movement in translation gives rise to such an action. It is also possible to measure acceleration, e.g. vertical acceleration, where such a measurement is noisier when the aircraft is taxiing than when it is stationary.

Optionally, it may be determined whether the aircraft is taxiing on the ground, and if the aircraft has not yet begun to taxi, a recommended position may then be displayed solely for the yaw movement control means.

This variant may be used during a period of accelerating the main rotor, e.g. after starting the aircraft on the ground.

In the first implementation, said at least one measurement relating to the left forces exerted on the left side undercarriage and to the right forces exerted on the right side undercarriage is performed indirectly by determining a roll angle of the aircraft.

Surprisingly, this information may suffice for evaluating loading asymmetry between the side undercarriages, and for estimating the corrective actions to be performed.

This first implementation results from the principle whereby there cannot be any large roll moment applied to the aircraft before its rotors have started. The loading of the undercarriages is then assumed to be symmetrical.

If a reference roll trim is determined before the rotors are started, the invention suggests returning to that reference trim in order to tend towards loading of the undercarriages that is more or less symmetrical.

A main rotor is considered as having started once the main rotor reaches a given speed of rotation.

Thus, in a variant of the first implementation, the following steps may be performed:
  determining an initial roll angle before starting the rotors of the aircraft;
  determining a current roll angle of the aircraft over time; and
  determining a recommended position for at least one of the yaw movement control and lateral cyclic pitch control means and displaying it on the display unit so that the current roll angle tends towards the initial roll angle.

Until the rotors have started, the roll trim of the aircraft is measured by using the initial roll angle. This initial roll angle is thus representative of a reference trim that is to be retained.

The difference between the initial roll angle and the current roll angle is an indirect measurement of the loading asymmetry of the landing gear. This indirect measurement can be used for calculating the recommended positions for returning to symmetrical loading of the undercarriages.

Optionally, the following steps are performed:
  determining an initial roll angle before starting the rotors over a given period of time in order to determine a maximum initial roll angle and a minimum initial roll angle reached during said period; and
  inhibiting the display of each recommended position when the difference between said maximum initial roll angle and said minimum initial roll angle exceeds a threshold difference.

The period of time in question may come to an end when the main rotor starts.

During this period of time, the extreme values of the initial roll angle are saved in memory. If the difference between the two extreme values is too great, then the aircraft is on a moving platform, such as the deck of a vessel, for example. The reference roll trim is not suitable for being used. Under such circumstances, no recommended control position can be calculated and displayed to the pilot.

In contrast, if the extreme values of the roll trim are close together, then the aircraft is standing on stationary ground and its reference trim is suitable for use. The initial roll angle that is retained after this period of time may be the average between the maximum initial roll angle and the minimum initial roll angle.

The reference trim is valid only insofar as the aircraft is still at the location where it was determined.

The first implementation must thereof be inhibited once the aircraft has started moving on the ground.

In a second implementation, at least one measurement relating to the left forces exerted on the left side undercarriage and to the right forces exerted on the right side undercarriage is performed directly in order to evaluate said asymmetry by determining the forces exerted on the left undercarriage and on the right undercarriage by using measurement means arranged on each undercarriage.

When the aircraft is on the ground and by using specific sensors, asymmetry of undercarriage loading can thus be measured.

This second implementation is reliable both when the aircraft is stationary and when it is taxiing.

Under such circumstances, said at least one measurement relating to the left forces exerted on the left side undercarriage and to the right forces exerted on the right side undercarriage may be performed directly in order to determine whether loading asymmetry exists by applying at least one of the following methods:
- the left and right forces are determined by means for measuring forces proper;
- the left and right forces are determined by devices for measuring pressure by measuring the pressure within a shock absorber in each undercarriage; and
- the left and right forces are determined by devices for measuring position by measuring the position of at least one movable member of each undercarriage.

By way of example, it is possible to measure the force in each undercarriage, the pressure within the shock absorber in each undercarriage, or indeed the position of a strut of each undercarriage, by using force, pressure, or position sensors.

The comparison between the left and right measurements then makes it possible to determine whether the landing gear is loaded symmetrically, thereby guaranteeing that it is in the middle of its stability domain, or whether it is loaded asymmetrically.

It is also possible to evaluate potential asymmetry of loading by taking a single measurement relating to the left forces exerted on the left side undercarriage and to the right forces exerted on the right side undercarriage, by applying at least one of the following methods:
- measuring a pressure difference between a pressure existing within a shock absorber of a right undercarriage and a pressure existing within a shock absorber in a left undercarriage; and
- measuring a position difference between a position of at least one movable member of a right undercarriage and a position of at least one movable member of a left undercarriage.

Consequently, it is possible to evaluate loading asymmetry by measuring the left and right forces, or by measuring the difference between those forces.

The first and second implementations may be combined.

For example, before starting the main rotor, it may be considered that the aircraft is in a first operating state. In this first operating state, nothing can be displayed since the aircraft is stable on the ground.

Once the main rotor has started, the aircraft has moved into a second operating state. During this second operating state, it is possible to apply the first implementation.

In contrast, as soon as the aircraft is taxiing, it has changed to a third state of operation during which the second implementation is applied.

Finally, when the aircraft takes off, it changes to a fourth state of operation, during which no recommended position is displayed.

In addition, it is also possible to trigger an alert when said at least one measurement relating to the left forces exerted on the left side undercarriage and to the right forces exerted on the right side undercarriage reveal asymmetry between the left and right forces that exceeds a certain threshold as determined by the manufacturer.

The alert may be a visible and/or audible alert in the event of the loading asymmetry of the undercarriages exceeding a reasonable limit in order to request the pilot to act urgently to find a symmetrical loading of the undercarriages by using the information on the display unit.

The invention also provides an aircraft having a main rotor and a yaw movement control rotor, the aircraft having control means including lateral cyclic pitch control means for the main rotor and yaw movement control means for the yaw movement control rotor, the aircraft including landing gear having at least one left side undercarriage and at least one right side undercarriage that are arranged on either side of an anteroposterior longitudinal plane of the aircraft. The left side undercarriage and the right side undercarriage may in particular be wheeled undercarriages.

The aircraft includes an assistance device performing the above-described method, the assistance device having:
- a measurement system for determining asymmetry, if any, of the left and right forces exerted respectively on the left side undercarriage and on the right side undercarriage by taking at least one measurement relating to the left forces exerted on the left side undercarriage and to the right forces exerted on the right side undercarriage;
- processor means for determining a recommended position for at least one of the yaw movement control and lateral cyclic pitch control means in order to make the left forces and the right forces more symmetrical; and
- a display unit for displaying at least one item of information relating to said recommended position in order to inform a pilot of the position to be reached by said control means in question in order to keep the aircraft in a domain of roll stability.

In an embodiment, the assistance device may include at least one of the following members:
- means for measuring a roll angle of the aircraft; and
- means for measuring the forces exerted on two distinct undercarriages.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Figure 1:
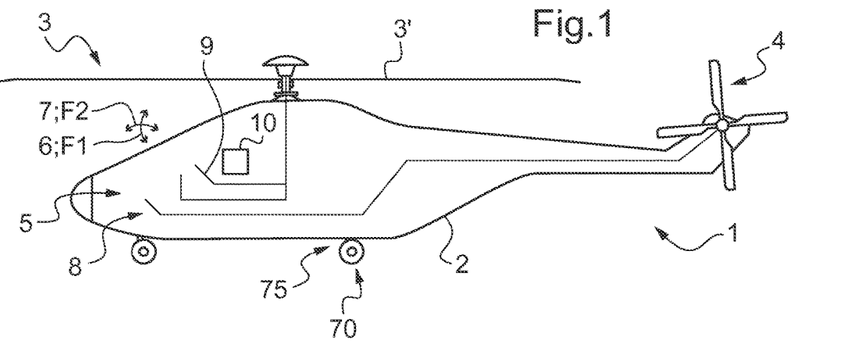
FIG. 1 is a diagrammatic view of an aircraft of the invention.

FIG. 1 shows an aircraft 1 having an airframe 2.

The airframe 2 carries a rotary wing. The rotary wing is constituted by a main rotor 3 having a plurality of blades 3'. The main rotor 3 thus provides the aircraft with at least some of its lift, and, by way of example, if the aircraft is a helicopter, it also provides it with propulsion.

The airframe 2 also carries a yaw movement control rotor 4, conventionally referred to as a "tail" rotor.

The aircraft also has landing gear on which the airframe 2 rests. The landing gear comprises three wheeled undercarriages. Under such circumstances, the landing gear has a left side undercarriage 70 and a right side undercarriage 75 that are arranged symmetrically on either side of the antero-posterior plane of symmetry of the aircraft. In FIG. 1, the right side undercarriage 75 is hidden by the left side undercarriage 70.

In addition, the aircraft 1 has control means 5 for controlling the main rotor 3 and for controlling the yaw movement control rotor 4.

Such control means 5 include yaw movement control means 8, e.g. of the type comprising pedals. The yaw movement control means 8 co-operate with the yaw movement control rotor 4.

The control means 5 include also a cyclic stick for modifying the pitch of the blades 3' of the main rotor 3 cyclically. The cyclic stick then includes lateral cyclic pitch control means 6 on being manipulated in a lateral direction represented by double-headed arrow F1, and longitudinal cyclic pitch control means 7 on being manipulated in a longitudinal direction represented by double-headed arrow F2. Naturally, the cyclic stick may be manipulated in any direction, and is suitable for acting simultaneously on the lateral cyclic pitch and on the longitudinal cyclic pitch.

The control means 5 also include collective pitch control means 9 for modifying the pitch of the blades 3' of the main rotor 3 collectively. The collective pitch control means 9 are conventionally referred to as the "collective pitch lever" or indeed as the "collective stick".

The aircraft is also provided with an assistance device 10 that applies the method of the invention in order to facilitate the work of a pilot on the ground.

Figure 2:
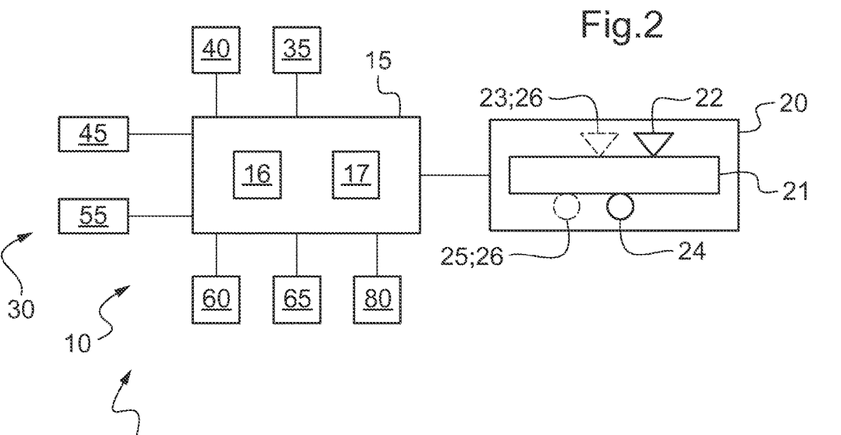
FIG. 2 is a diagram showing an assistance device.

With reference to FIG. 2, the assistance device 10 includes a processor unit 15. The processor unit 15 may comprise calculation means 16 and storage means 17, the calculation means executing instructions stored in the storage means 17 in order to perform said method. Such calculation means may comprise at least one processor.

The processor unit 15 is then connected to a display unit 20. The display unit 20 may comprise a display screen 21 suitable for presenting symbols in order to assist a pilot.

It can be understood that the processor unit 15 and the display unit 20 may form a single piece of equipment.

The processor unit is also connected in particular to a measurement system 30 seeking to collect data making it possible to determine whether the left side undercarriage and the right side undercarriage are being subjected to asymmetrical loads when the aircraft is on the ground.

By way of example, such a measurement system 30 may comprise measurement means 55 for measuring a roll angle of the aircraft, such as an inclinometer or an inertial unit, for example.

The measurement system 30 may also be provided with a measurement device 60 for measuring the forces proper exerted on the left side undercarriage 70 and on the right undercarriage 75. The measurement device 60 may include devices for measuring forces proper, devices for measuring pressures, or indeed devices for measuring position, in order to determine said forces proper.

Furthermore, the measurement system 30 may include a first device 35 for measuring the speed of rotation of the main rotor 3, and a second device 40 for measuring the speed of rotation of the yaw movement control rotor 4.

The first device 35 and the second device 40 may be embodied as a single device. The main rotor 3 and the yaw movement control rotor 4 are usually dynamically connected together. Their speeds of rotation are thus at a constant ratio. Under such circumstances, a single measurement device suffices.

Likewise, a third device 45 is used to determine whether the aircraft is taxiing.

It should be observed that the devices delivering data to the processor unit are members that are usually present on aircraft.

Figure 3:
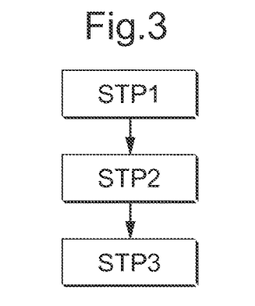
FIG. 3 is a diagram showing the stages of a method of the invention.

FIG. 3 explains the method applied by the assistance device.

During a first stage STP1, it is determined whether the left side undercarriage 70 and the right side undercarriage 75 are loaded symmetrically.

The measurement system 30 then acts directly or indirectly to take at least one measurement relating to the left forces acting on the left side undercarriage and the right forces acting on the right side undercarriage.

The measurement system 30 may process these measurements in order to evaluate whether any asymmetry of the forces is present, or in order to transmit the measurements to the processor unit for this purpose.

During a second stage STP2, if the landing gear is subjected to loading that is judged to be asymmetrical, the processor unit determines a recommended position for least one of the control means comprising the lateral cyclic pitch control means 6 and the yaw movement control means 8, with this being determined in particular as a function of the observed asymmetry.

For this purpose, during an initialization stage, the manufacturer determines the influence of the lateral cyclic pitch control means 6 and of the yaw movement control means 8 on the asymmetry of the left and right forces. The manufacturer then determines the recommended positions to be applied in order to counter such asymmetry, e.g. by testing or by simulation.

The results of this initialization stage are stored in the processor unit.

During the initialization stage, the manufacturer may take into consideration the speed of rotation of the main rotor 3 and/or the speed of rotation of the yaw movement control rotor 4 when determining the influence of the yaw and lateral cyclic pitch control means 8 and 6 on the asymmetry of the left and right forces.

Under such circumstances, if asymmetry is observed in the forces exerted on the left and right side undercarriages, the processor unit establishes the appropriate recommended positions for re-establishing symmetrical loading.

It should be observed that the second stage may also be performed when the loading of the undercarriages is symmetrical. If the loading is symmetrical, the method then leads to at least one recommended position that is close to the current position of the controls.

During a third stage STP3, the processor unit causes each determined recommended position to be displayed on the display unit 20. The pilot can then discover the positions to be reached by the control means in question for the purpose of keeping the aircraft within a domain of stability in terms of rolling on the ground.

The calculation means 16 then execute instructions in order to determine the required recommended positions over time. The calculation means 16 then send orders to the display unit 20 to cause it to display symbols on the display screen 21, the symbols representing each of the recommended positions that are to be displayed.

It should be observed that it is also possible to determine, and to display on the display unit 20, the current position of each control means for which a recommended position is being displayed.

Consequently, if necessary, the processor unit may co-operate with dedicated sensors 65 for determining the current position of the lateral cyclic pitch control means 6. Likewise, if necessary, the processor unit may co-operate with sensors 80 for determining the current position of the yaw movement control means 8.

The processor unit may also trigger an alert when asymmetrical loading is identified.

With reference to FIGS. 4 to 7, the processor unit may determine and cause to be displayed a first recommended position 23 for the lateral cyclic pitch control means 6 and a second recommended position 25 for the yaw movement control means 8.

Figure 4:
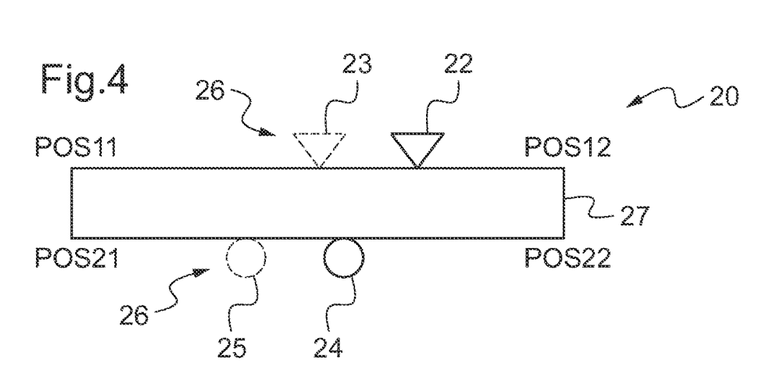
FIGS. 4 to 6 are diagrams showing the information displayed depending on the state of the aircraft.

With reference to FIG. 4, the display unit may comprise a strip 27 together with each recommended position.

Consequently, the display unit displays a first symbol representing the first recommended position 23 and a second symbol representing the second recommended position 25. The first and second symbols move between the ends of the strip. These ends represent extreme values POS11, POS12, POS21, and POS22 of the lateral cyclic pitch control means 6 and of the yaw movement control means 8.

Likewise, on request from the processor unit, the display unit may display a symbol representing the first current position 22 and a symbol representing the second current position 24.

It can be understood that the term "position" is used herein to mean a position as such, or the value of a parameter representative of the position.

Figure 7:
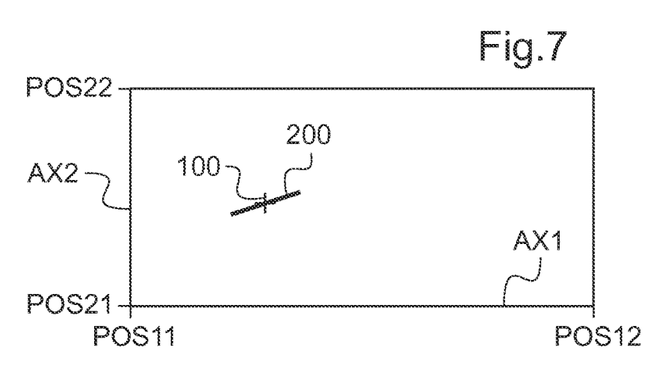
FIG. 7 is a graph explaining how to determine the recommended positions for presenting during the first operating state of the aircraft.

In the variant of FIG. 7, the processor unit gives a two-dimensional representation in the form of a rectangle or a square.

This representation has a horizontal first axis AX1 showing the position of the lateral cyclic pitch control means 6, and a vertical second axis AX2 showing the position of the yaw movement control means 8. By way of example, each control means may be capable of varying between a respective first extreme position POS11, POS21 and a respective second extreme position POS12, POS22.

A symbol may represent the current position of the lateral cyclic pitch control means 6, and of the yaw movement control means 8. Crosshairs 100 may be used for this purpose.

In addition, a single symbol 200 can be used to display the recommended position for the lateral cyclic pitch control means 6 and for the yaw movement control means 8. This single symbol optionally marks an area in order to cover all possible solutions.

For the purpose of keeping the aircraft in a stable domain, the manufacturer may also give priority to a single one of the flight controls by displaying a recommended position on a scale, either for the lateral cyclic pitch control means or else for the yaw movement control means, as a function of whether the aircraft is moving relative to the ground.

Figure 5:
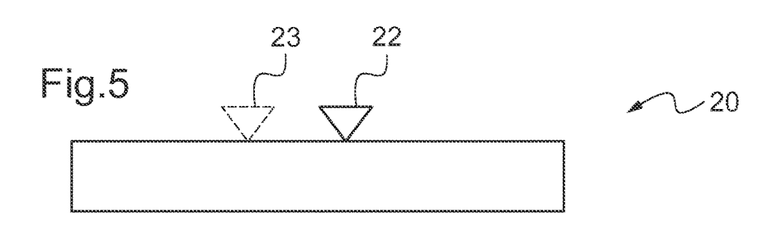

For example, in FIG. 5, the processor unit displays information relating only to the lateral cyclic pitch control means.

For example, the processor unit determines whether the aircraft 1 is taxiing along the ground. The processor unit then causes only the recommended position for the lateral cyclic pitch control means to be displayed while the aircraft is taxiing, and possibly also the current position of the lateral cyclic control means.

For this purpose, the processor unit may co-operate with members of the aircraft, such as means for determining the position of the aircraft, for example.

The processor unit may also cause only the recommended position of the yaw movement control means to be displayed when the aircraft is not taxiing.

Figure 6:
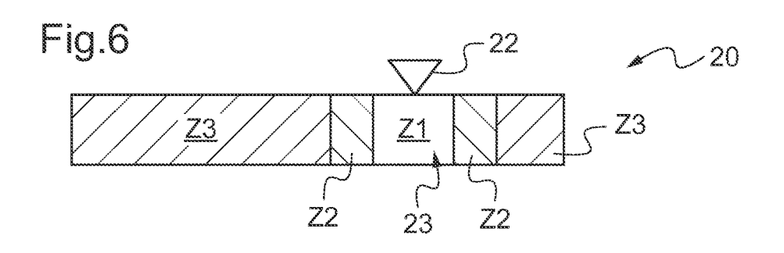

In the variant of FIG. 6, the display unit may present a strip presenting various zones such as a high-risk zone Z3, an intermediate zone Z2, and a safe zone Z1 representing the recommended position for the lateral cyclic pitch control means.

When the current position of the lateral cyclic pitch control means lies outside the safe zone Z1, it is possible to trigger a visible and/or audible alarm.

With reference to FIG. 2, in an embodiment, the measurement system 30 co-operates with the measurement device 60 in order to take at least one measurement directly relating to the left forces exerted on the left side undercarriage and to the right forces exerted on the right side undercarriage.

The measurement system may process the measurements in order to evaluate the presence of asymmetry in loading that needs to be corrected, or indeed to deliver the measurements taken to the processor unit 15.

In another embodiment, the measurement system performs said at least one measurement concerning the left forces exerted on the left side undercarriage and the right forces exerted on the right side undercarriage indirectly by determining a roll angle of the aircraft.

Furthermore, the processor unit 15 may make use of the data from the measurement means 55 in order to determine the initial roll angle of the aircraft prior to starting the main rotor.

In a variant, the processor unit 15 requests the measurement means 55 to determine an initial maximum roll angle and an initial minimum roll angle reached during this period. The processor unit 15 can then inhibit the display of the recommended position for the yaw movement control means when the difference between the maximum initial roll angle and the minimum initial roll angle exceeds a threshold difference.

Furthermore, after the main rotor has been started, the processor unit 15 uses the data from the measurement means 55 to determine the current roll angle of the aircraft.

The manufacturer may also act during an initialization stage to determine the position that is to be reached by the yaw movement control means in order to generate a given roll angle.

Thereafter, the processor unit determines and displays on the display unit 15 a recommended position 23, 25 for at least one of the yaw movement control and lateral cyclic pitch control means 8 and 6 so that the current roll angle tends towards said initial roll angle with the help of information that was stored during the initialization stage.

When the roll angle has been measured over a given period on starting, it is possible for the initial roll angle to be the maximum initial roll angle, for example, or else the minimum initial roll angle, or indeed a mean roll angle corresponding to the average of the maximum initial roll angle and the minimum initial roll angle.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, the landing gear described has three undercarriages. Nevertheless, that number is not limiting.

For example, the landing gear could have four undercarriages. It would then be possible to evaluate the undercarriages in pairs, or indeed to measure the forces on all four undercarriages and derive therefrom an asymmetry index.

What is claimed is:

1. A method of assisting a pilot to minimize the risk of an aircraft rolling over on the ground, the aircraft having a main rotor and a yaw movement control rotor, the aircraft having controls including a lateral cyclic pitch control to control the main rotor and a yaw movement control to control the yaw movement control rotor, the aircraft having landing gear provided with at least one left side undercarriage and at least one right side undercarriage that are arranged on either side of an anteroposterior longitudinal plane of the aircraft, wherein during a utilization stage the following steps are performed:
    taking at least one measurement relating to the left forces exerted on the left side undercarriage and to the right forces exerted on the right side undercarriage in order to evaluate asymmetry, if any, between the left and right forces;
    when the at least one measurement reveals asymmetry between the left and right forces, determining a recommended position for at least one of the yaw movement control and lateral cyclic pitch control in order to make the left and right forces more symmetrical; and
    using a display unit to display each recommended position to inform the pilot of the position to be reached by at least one of the yaw movement control and the lateral cyclic pitch control in order to keep the aircraft within a domain of roll stability on the ground.

2. A method according to claim 1, wherein during an initialization stage the influence of the yaw movement control and lateral cyclic pitch control on the asymmetry of the left and right forces is determined in order to establish at least one database providing the at least one recommended position for making the left and right forces more symmetrical, the database being used to determine each recommended position during the utilization stage.

3. A method according to claim 2, wherein:
    during the initialization stage, the influence of the yaw movement control and lateral cyclic pitch control on the asymmetry of the left and right forces is determined as a function of the speed of rotation of the main rotor and/or of the yaw movement control rotor; and
    during the utilization stage, at least one measurement is taken relating to the left forces exerted on the left side undercarriage and to the right forces exerted on the right side undercarriage, and at least one measurement is taken relating to each speed of rotation taken into consideration during the initialization stage.

4. A method according to claim 1, wherein with a recommended position for at least one of the controls being determined and displayed, a current position is determined of each controls for which a position is recommended, and the current position is displayed on the display unit.

5. A method according to claim 1, wherein, in order to display a recommended position for the lateral cyclic pitch control and for the yaw movement control, a single symbol is displayed in a two-dimensional representation in which the dimensions relate respectively to the position of the lateral cyclic pitch control and to the position of the yaw movement control.

6. A method according to claim 1, wherein priority is given to a single flight control for keeping the aircraft in the stable domain by displaying a recommended position on a scale either for the lateral cyclic pitch control or for the yaw movement control depending on the movement of the aircraft relative to the ground.

7. A method according to claim 6, that is determined whether the aircraft is taxiing on the ground, and if the aircraft is taxiing, a recommended position is displayed solely for the lateral cyclic pitch control.

8. A method according to claim 6, that is determined whether the aircraft is taxiing on the ground, and if the aircraft is not taxiing, a recommended position is then displayed solely for the yaw movement control.

9. A method according to claim 1, wherein the at least one measurement relating to the left forces exerted on the left side undercarriage and to the right forces exerted on the right side undercarriage is performed indirectly by determining a roll angle of the aircraft.

10. A method according to claim 9, wherein the following steps are performed:
    determining an initial roll angle before starting the rotors of the aircraft;
    determining a current roll angle of the aircraft over time; and
    determining a recommended position for at least one of the yaw movement control and lateral cyclic pitch control and displaying it on the display unit so that the current roll angle tends towards the initial roll angle.

11. A method according to claim 10, wherein the following steps are performed:
    determining an initial roll angle before starting the rotors of the aircraft over a given period of time in order to determine a maximum initial roll angle and a minimum initial roll angle reached during the period; and
    inhibiting the display of each recommended position when the difference between the maximum initial roll angle and the minimum initial roll angle exceeds a threshold difference.

12. A method according to claim 1, wherein at least one measurement relating to the left forces exerted on the left side undercarriage and to the right forces exerted on the right side undercarriage is performed directly in order to evaluate said asymmetry by determining the forces exerted on the left undercarriage and on the right undercarriage by using measurement means arranged on each undercarriage.

13. A method according to claim 12, wherein said at least one measurement relating to the left forces exerted on the left side undercarriage and to the right forces exerted on the right side undercarriage is performed directly in order to determine whether asymmetry exists by applying at least one of the following methods:

the left and right forces are determined by means for measuring forces proper;

the left and right forces are determined by devices for measuring pressure by measuring the pressure within a shock absorber in each undercarriage; and the left and right forces are determined by devices for measuring position by measuring the position of at least one movable member of each undercarriage.

14. A method according to claim 1, wherein potential asymmetry of loading is evaluated by taking a single measurement relating to the left forces exerted on the left side undercarriage and to the right forces exerted on the right side undercarriage, by applying at least one of the following methods:

measuring a pressure difference between a pressure existing within a shock absorber of a right undercarriage and a pressure existing within a shock absorber in a left undercarriage; and measuring a position difference between a position of at least one movable member of a right undercarriage and a position of at least one movable member of a left undercarriage.

15. A method according to claim 1, wherein an alert is triggered when the at least one measurement relating to the left forces exerted on the left side undercarriage and to the right forces exerted on the right side undercarriage reveal asymmetry between the left and right forces that exceeds a certain threshold.

16. An aircraft having a main rotor and a yaw movement control rotor, the aircraft having controls including a lateral cyclic pitch control to control the main rotor and a yaw movement control to control the yaw movement control rotor, the aircraft including landing gear having at least one left side undercarriage and at least one right side undercarriage that are arranged on either side of an anteroposterior longitudinal plane of the aircraft, wherein the aircraft includes an assistance device performing the method according to claim 1, the assistance device having:

a measurement system for determining asymmetry, if any, of the left and right forces exerted respectively on the left side undercarriage and on the right side undercarriage by taking at least one measurement relating to the left forces exerted on the left side undercarriage and to the right forces exerted on the right side undercarriage;

a processor for determining a recommended position for at least one of the yaw movement control and lateral cyclic pitch control in order to make the left forces and the right forces more symmetrical; and a display unit for displaying at least one item of information relating to the recommended position in order to inform a pilot of the position to be reached by at least one of the yaw movement control and the lateral cyclic pitch control in order to keep the aircraft in a domain of roll stability.

17. An aircraft according to claim 16, wherein the assistance device includes at least one of the following members:

means for measuring a roll angle of the aircraft; and means for measuring the forces exerted on two distinct undercarriages.

18. A method of assisting a pilot of an aircraft in reestablishing symmetrical loading on undercarriages to reduce the risk of the aircraft rolling over on a ground surface, the aircraft having a main rotor controlled by a lateral cyclic pitch control, a yaw movement control rotor controlled by a yaw movement control, and a display for displaying information to the pilot, the method comprising:

taking at least one measurement relating to a left force exerted on a left side undercarriage of the aircraft and a right force exerted on a right side undercarriage of the aircraft;

evaluating the at least one measurement to determine asymmetry between the left and right forces;

in response to determining asymmetry, determining a first recommended position for the yaw movement control to control the yaw movement control rotor of the aircraft, and a second recommended position for the lateral cyclic pitch control to control the main rotor of the aircraft; and displaying a graphical representation of the first and second recommended positions on the display to inform the pilot of the position to be reached by at least one of the yaw movement control and the lateral cyclic pitch control in order to keep the aircraft within a domain of roll stability on the ground.

19. A system for assisting a pilot of an aircraft in reestablishing symmetrical loading on undercarriages to reduce the risk of the aircraft rolling over on a ground surface, the aircraft having a main rotor controlled by a lateral cyclic pitch control, a yaw movement control rotor controlled by a yaw movement control, the system comprising:

a processor adapted to:

receive at least one measurement relating to a left force exerted on a left side undercarriage of the aircraft and a right force exerted on a right side undercarriage of the aircraft;

evaluate the at least one measurement to determine asymmetry between the left and right forces; and in response to determining asymmetry, determine a first recommended position for the yaw movement control to control the yaw movement control rotor and a second recommended position for the lateral cyclic pitch control to control the main rotor; and a display unit adapted to display a graphical representation of the first and second recommended positions, the graphical representation including a first axis corresponding to the first recommended position for the yaw movement control to control the yaw movement control rotor, and a second axis corresponding to the second recommended position for the lateral cyclic pitch control to control the main rotor.

* * * * *

UNITED STATES PATENT AND TRADEMARK OFFICE
CERTIFICATE OF CORRECTION

PATENT NO. : 9,796,470 B2
APPLICATION NO. : 14/024756
DATED : October 24, 2017
INVENTOR(S) : Andre-Michel Dequin Page 1 of 1

It is certified that error appears in the above-identified patent and that said Letters Patent is hereby corrected as shown below:

In the Claims

Column 3, Line 35, Claim 1:
Delete "one measurement" and
Insert -- one measurement, by a measurement system, --.

Column 13, Line 40, Claim 1:
Before "when the at least"
Insert -- evaluating, with an assistance device, the at least one measurement, and --.

Column 16, Line 10, Claim 18:
Delete "one measurement" and
Insert -- one measurement, by a measurement system --.

Column 16, Line 15, Claim 18:
Delete "evaluating" and
Insert -- evaluating, with an assistance device, --.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*